US012209457B2

(12) United States Patent
Wang

(10) Patent No.: US 12,209,457 B2
(45) Date of Patent: Jan. 28, 2025

(54) DECELERATING AND POSITIONING DEVICE FOR ROLLER SHADE

(71) Applicant: Chih-Yung Wang, Taipei (TW)

(72) Inventor: Chih-Yung Wang, Taipei (TW)

( * ) Notice: Subject to any disclaimer, the term of this patent is extended or adjusted under 35 U.S.C. 154(b) by 296 days.

(21) Appl. No.: 17/968,425

(22) Filed: Oct. 18, 2022

(65) Prior Publication Data

US 2024/0125175 A1 Apr. 18, 2024

(51) Int. Cl.
*E06B 9/60* (2006.01)
*E06B 9/42* (2006.01)
*E06B 9/88* (2006.01)

(52) U.S. Cl.
CPC .................. *E06B 9/88* (2013.01); *E06B 9/42* (2013.01); *E06B 9/60* (2013.01)

(58) Field of Classification Search
CPC ........ E06B 9/56; E06B 2009/807; E06B 9/82; E06B 9/60; E06B 9/42; E06B 9/68; E06B 9/88
See application file for complete search history.

(56) References Cited

U.S. PATENT DOCUMENTS

| | | | | | |
|---|---|---|---|---|---|
| 4,427,050 | A * | 1/1984 | Toppen | E06B 9/60 | 160/315 |
| 4,482,137 | A * | 11/1984 | Gavagan | B60R 5/047 | 160/315 |
| 4,523,620 | A * | 6/1985 | Mortellite | E06B 9/60 | 160/315 |
| 6,467,714 | B1 * | 10/2002 | Rasmussen | E06B 9/44 | 242/381 |
| 6,955,207 | B2 * | 10/2005 | Minder | E06B 9/60 | 160/293.1 |
| 8,286,685 | B2 * | 10/2012 | Hsieh | E06B 9/78 | 160/307 |
| 11,339,608 | B2 * | 5/2022 | Norton | E06B 9/42 | |
| 2015/0376941 | A1 * | 12/2015 | Fujita | E06B 9/58 | 160/241 |

FOREIGN PATENT DOCUMENTS

| | | |
|---|---|---|
| TW | I772122 | 7/2022 |

* cited by examiner

*Primary Examiner* — Abe Massad
(74) *Attorney, Agent, or Firm* — MUNCY, GEISSLER, OLDS & LOWE, P.C.

(57) ABSTRACT

A decelerating and positioning device for a roller shade, the decelerating and positioning device comprising a sleeve, an elastic member provided on one side of the sleeve, a rotator providing an engagement structure on an other side of the elastic member, a limiting rotating body pushes the rotator to rotate and displace, and a fixing shaft allowing the limiting rotating body and the rotator to rotate.

8 Claims, 14 Drawing Sheets

DECELERATING AND POSITIONING DEVICE FOR ROLLER SHADE

FIELD OF THE INVENTION

The invention relates to a decelerating and positioning device, and more particularly, to a decelerating and positioning device for a roller shade.

BACKGROUND OF THE INVENTION

Proper upper positioning device and lower positioning device are not provided in conventional roller shades. When the curtain sheet of the roller shade is pulled down, the curtain sheet may be pulled too long. On the contrary, when the curtain sheet of the roller shade is rolled up, the excessive rolling force causes the curtain sheet to turn over to the other side of the upper rail.

Accordingly, a roller shade equipped with upper and lower positioning devices is provided in the industry. The roller shade can be pulled to a lower limit. In particular, when the roller shade reaches the upper limit of the roller, large impact force and large noise are generated. For example, as a roller shade provided in the Taiwan Patent No. 1772122, with reference to FIGS. 1 and 2, the roller shade 1 includes an upper rail 11, a roller device 12 installed at one side of the upper rail 11, a limiting device 13 installed at the other side of the upper rail 11, two fixing brackets 14 respectively coupled the roller unit 12 and the limiting device 13 at both sides above a window, a lower rail 15 separately provided below the upper rail 11, and a curtain sheet 16. The user pulls down the lower rail 15 of the curtain sheet 16 to position the lower rail 15 at point A. When the curtain sheet 16 is rolled up and the lower rail 15 of the curtain sheet 16 reaches the point A1 of the upper limit position, large impact force and a large noise are generated, so that parts inside the limiting device 13 are damaged over time.

SUMMARY OF THE INVENTION

The main object of the invention is to solve the problems caused by the high impact force and noise generated when the lower rail of the curtain sheet is rolled up to the upper limit position, thereby also causes a problem of damaging the parts inside the limiting device.

In order to achieve the object, the invention provides a decelerating and positioning device for a roller shade, comprising: a sleeve, comprising a convex cover wall and a protruding rod protruding from a side of the convex cover wall, wherein the convex cover wall comprises a first opening, the protruding rod comprises a second opening, a first chamber communicating with the first opening is formed in the convex cover wall and one side of the protruding rod, a first shaft hole including a first fixing portion is formed in the protruding rod, a second chamber communicates with the second opening, the first shaft hole and the first opening is formed in the protruding rod, and a first protruding block protrudes at an end of the protruding rod; an elastic member, wherein a side of the elastic member is sheathed on one side of the sleeve, an other side of the elastic member is fixed on a side of a rotator, and the elastic member extends and retracts between the sleeve and the rotator; the rotator, providing an engagement structure on the other side of the elastic member, wherein the rotator comprises a protrusion and a clamping part at a side opposite to the protrusion, wherein the protrusion comprises a third opening, a third chamber communicating with the third opening and being formed in the protrusion, and a second protruding block being provided at an end of the third chamber, the second protruding block abuts the first protruding block, wherein the clamping part comprises a second shaft hole, an inner space partitioned by a ring protrusion, a first abutment, and at least one insertion hole, the second shaft hole communicates with the third chamber and the third opening, the first abutment connects the ring protrusion and the clamping part, the at least one insertion hole is formed in the inner space of the clamping part and allows the other side of the elastic member to be inserted and positioned, and the second shaft hole includes a first threaded portion; a limiting rotating body, being movably screwed to a fixing shaft, the limiting rotating body being provided with a third shaft hole having a second threaded portion, and at least one limiting groove, wherein two sides of the limiting rotating body respectively have a second abutment and a third abutment which are adjacent to the at least one limiting groove and are opposite to each other, and the second abutment of the limiting rotating body correspondingly engages the first abutment of the rotator; the fixing shaft, allowing the limiting rotating body and the rotator to rotate, the fixing shaft is fixed in the sleeve, wherein the fixing shaft comprises a shaft rod, a convex ring body connected to one side of the shaft rod, a third threaded portion connected to the convex ring body and protruding in an opposite direction with respect to the shaft rod, and a second fixing portion connected to the third threaded portion and protruding in an opposite direction with respect to the convex ring body, the convex ring body is provided with a fourth abutment from one side surface facing the third threaded portion, the fourth abutment correspondingly engages the third abutment of the limiting rotating body, the third threaded portion fastens with the second threaded portion of the limiting rotating body and the first threaded portion of the rotator, and the second fixing portion engages the first fixing portion; wherein when winding the roller shade up to an upper limit position, the limiting rotating body rotates and pushes the rotator to rotate and displace, the rotator further compresses the elastic member fixed with the rotator, and a buffering deceleration effect is generated.

Furthermore, the protruding rod comprises a first rod body connected to the side of the convex cover wall and having an outer diameter smaller than the outer diameter of the convex cover wall, a second rod body connected to one side of the first rod body, and a third rod body connected to one side of the second rod body and having an outer diameter smaller than an outer diameter of the second rod body, the second rod body comprises an external thread screwing the elastic member, an outer periphery of one side to the other side of the second rod body is tapered in a conical shape, and the second rod body has the outer diameter larger than the outer diameter of the first rod body.

Furthermore, a first penetrating space and a second penetrating space are formed through a side and the other side of the elastic member, the second rod body inserts into the first penetrating space, and the side of the rotator inserts into the second penetrating space.

Furthermore, an outer circumference of the protrusion of the rotator is provided with a protruding block between the clamping part and restricting the elastic member.

Furthermore, the elastic member is a spring.

Furthermore, the first abutment, the second abutment, the third abutment and the fourth abutment are bumps.

Furthermore, the first fixing portion is a protrusion, and an outer surface of the second fixing portion comprises a groove correspondingly engaged with the first fixing portion.

Furthermore, the shaft rod comprises a fourth shaft hole and a fixing hole penetrating the fourth shaft hole, and the fourth shaft hole is a hexagonal hole and is fixed with a fixing member penetrating the fixing hole at an outer circumference of the shaft rod.

Through the foregoing implementation of the invention, the following features are provided in comparison with the conventional technique.

According to the invention, through the fixing shaft of the decelerating and positioning device, when the roller shade is rapidly rolled up to the upper limit position, the limiting rotating body rotates to be engaged with the rotator and drives the rotator to rotate and displace, so that the rotator further drives the elastic member fixed in connection with the rotator into a torsional state. The elastic member has a greater torsional elasticity. When the roller shade is rapidly rolled up to the upper limit position, a buffering deceleration is instantaneously generated to reduce impact force and noise, and damage to parts inside the decelerating and positioning device is avoided.

DETAILED DESCRIPTION OF THE PREFERRED EMBODIMENTS

The detailed description and technical contents of the invention are described with reference to the drawings as follows.

Figure 1:
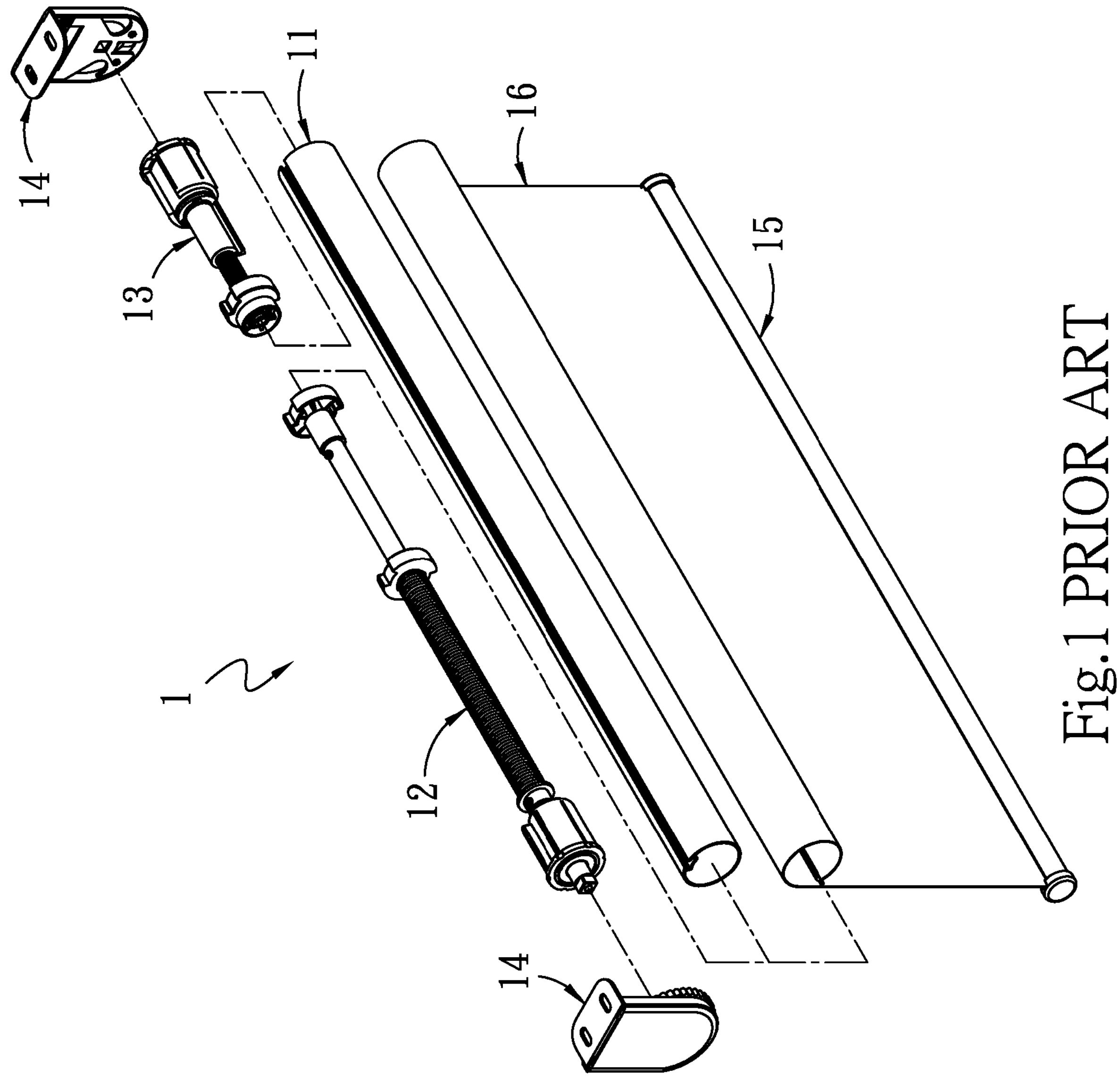
Fig.1 PRIOR ART
FIG. 1 is an exploded perspective view of a roller shade of the Taiwan Patent No. 1772122.
Figure 2:
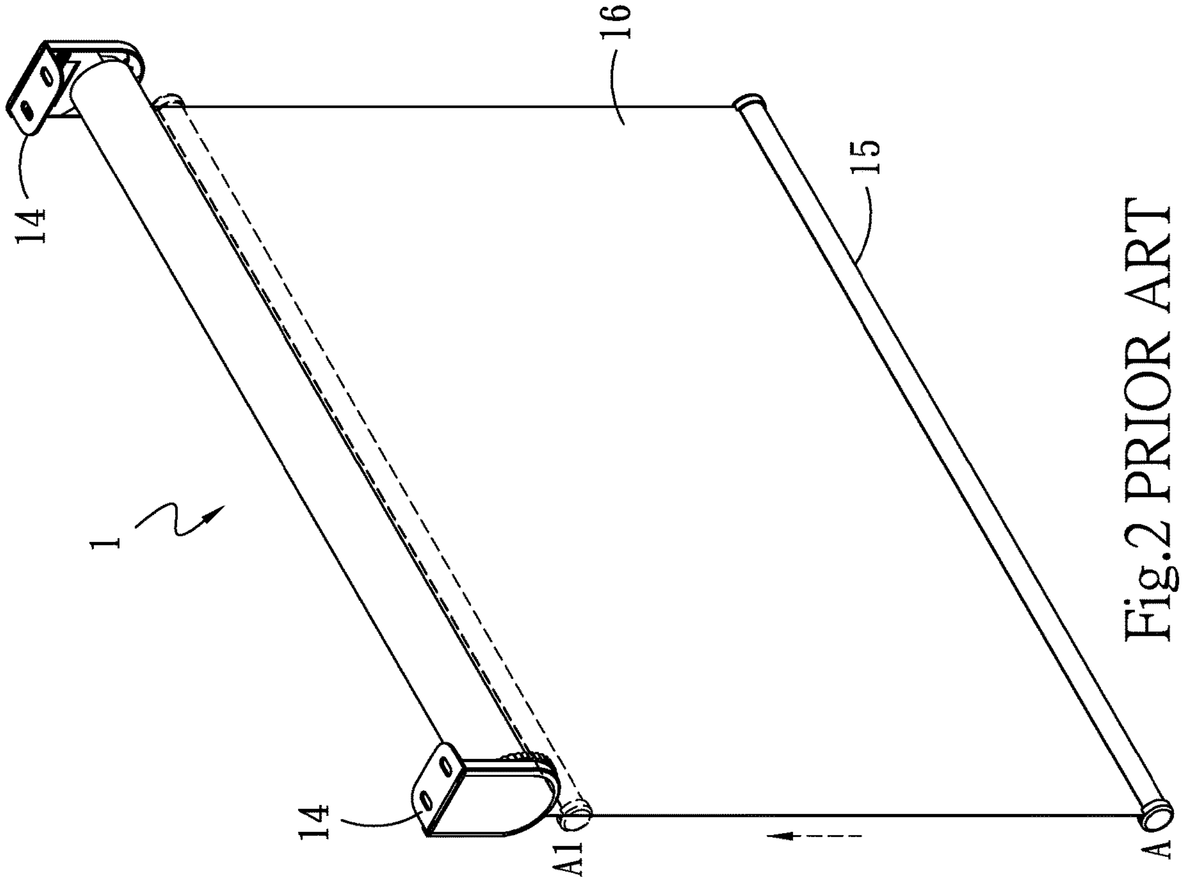
Fig.2 PRIOR ART
FIG. 2 is a schematic diagram of a curtain sheet of the roller shade of FIG. 1 being rolled up.
Figure 3:
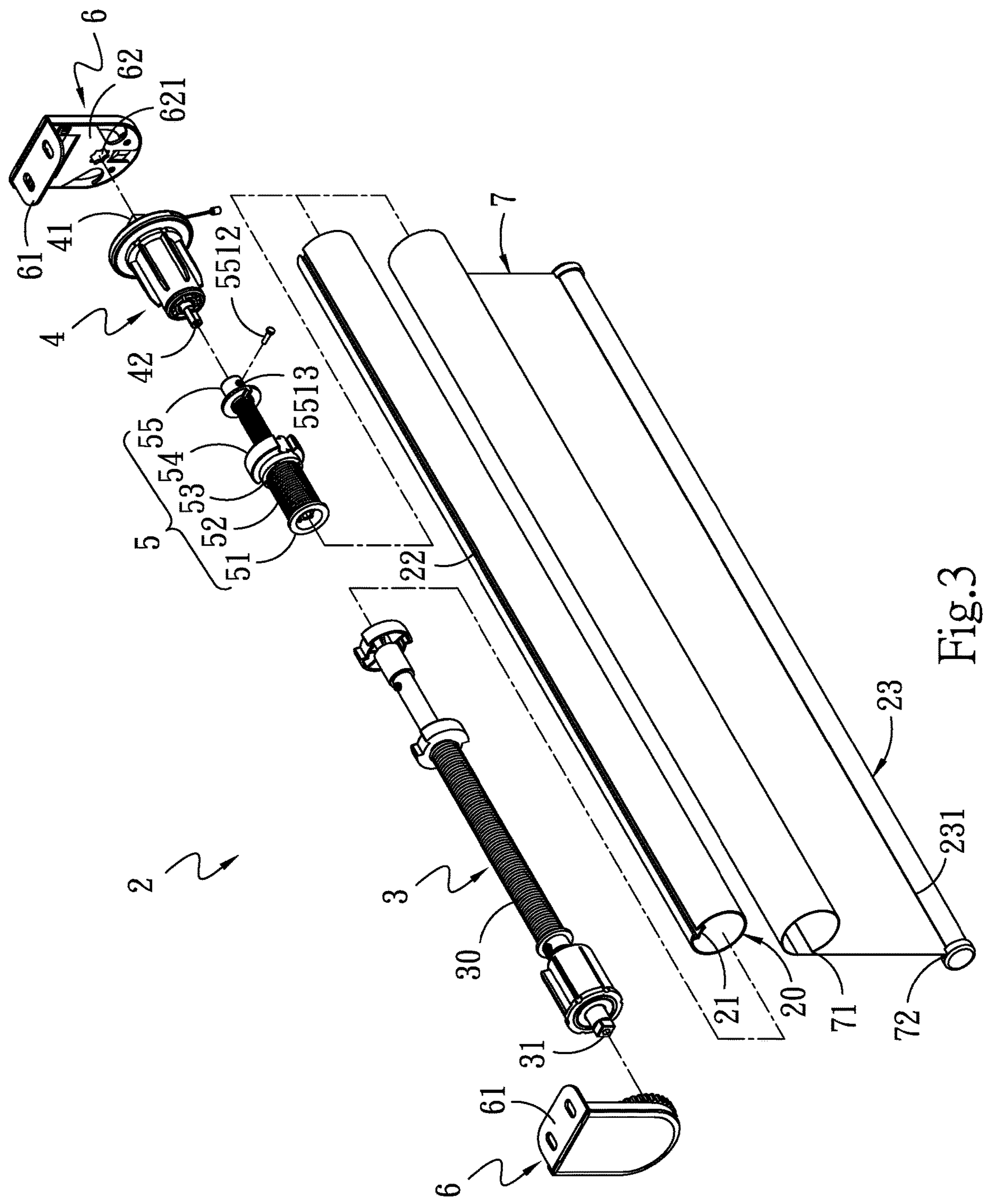
FIG. 3 is an exploded perspective view of a roller shade provided with ad decelerating and positioning device according to the invention.
Figure 4:
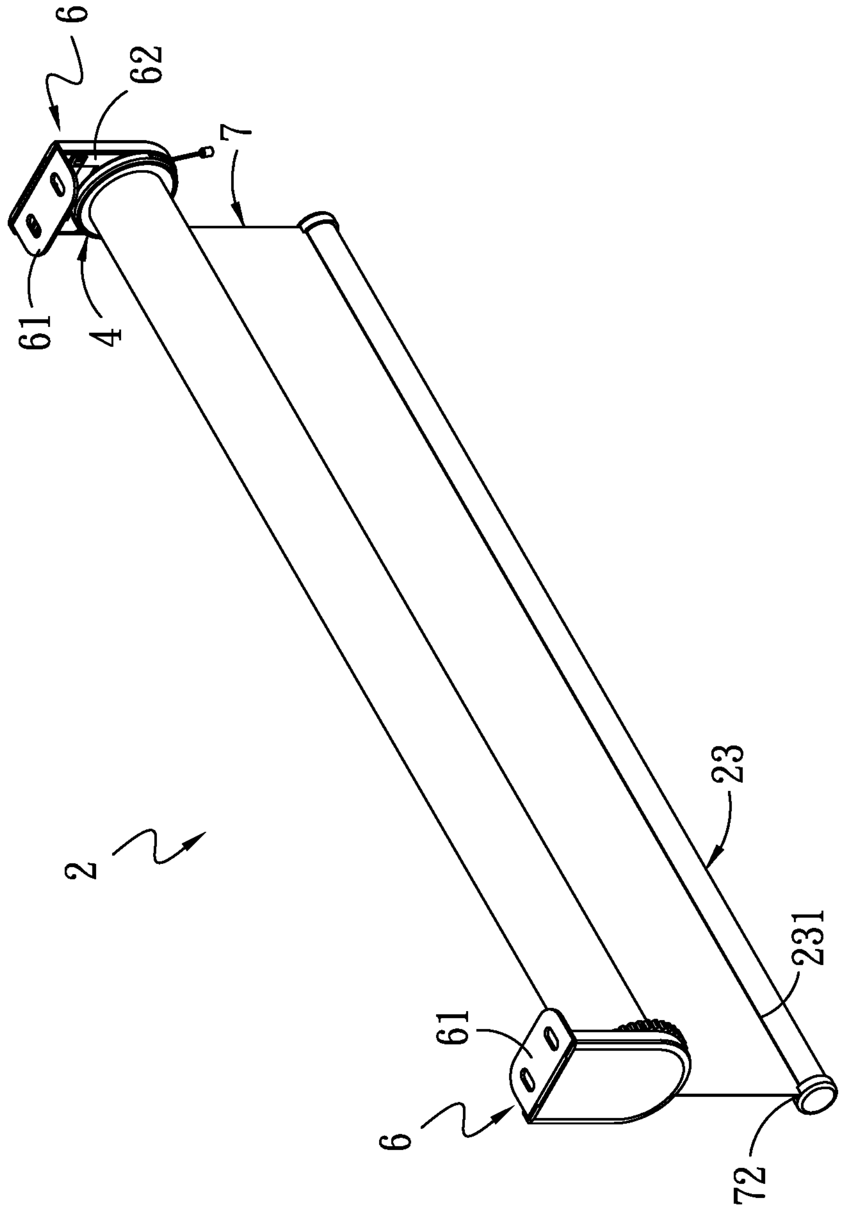
FIG. 4 is a schematic diagram of a roller shade according to the invention.
Figure 5:
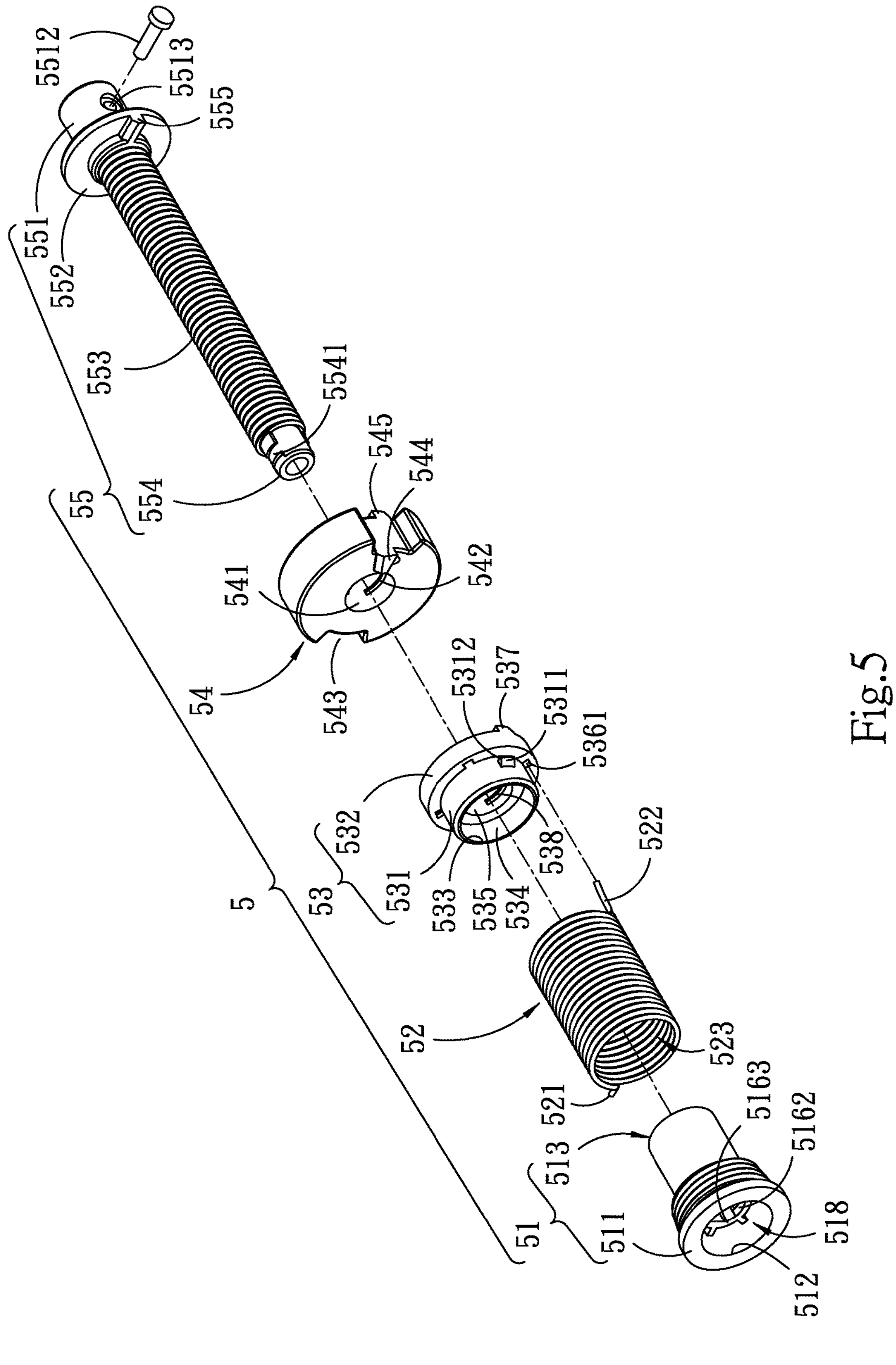
FIG. 5 is an exploded perspective view of the decelerating and positioning device of the invention.
Figure 6:
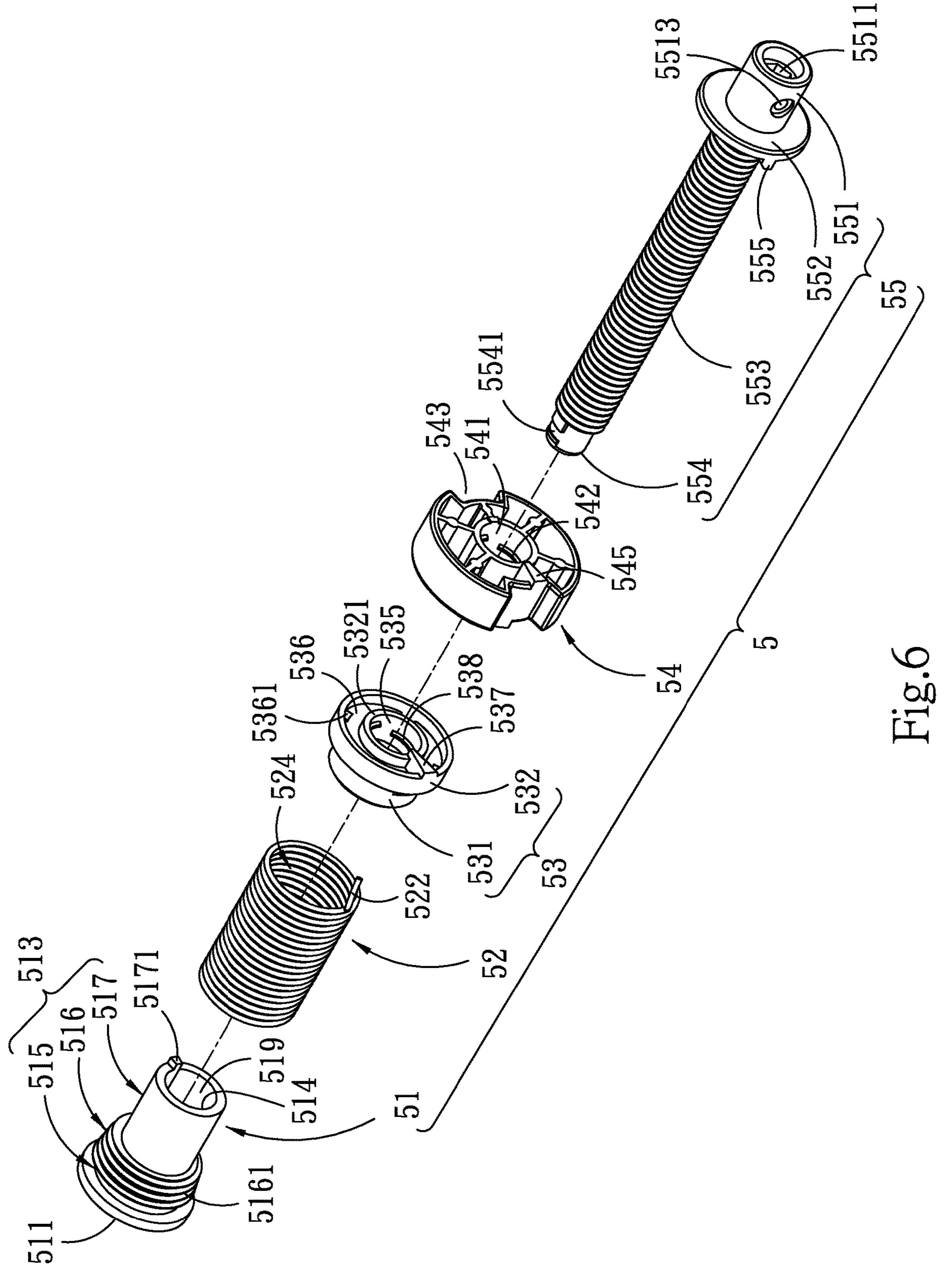
FIG. 6 is an exploded perspective view of the decelerating and positioning device of FIG. 5 at another angle.

With reference to FIGS. 3 and 4, the invention provides a decelerating and positioning device for a roller shade. In this embodiment, the roller shade 2 comprises an upper rail 20, a roller shade device 3 mounted on one side of the upper rail 20, a roll-up control device 4 mounted in the upper rail 20 and opposite to one side of the roller shade device 3, a decelerating and positioning device 5 mounted in the upper rail 20 and connected to one side of the roll-up control device 4, two fixing brackets 6 respectively coupling the roller shade device 3 and the roll-up control device 4 at two sides above a window, a lower rail 23 separately provided below the upper rail 20, and a curtain sheet 7. The upper rail 20 is provided with a limiting protrusion 21, wherein the limiting protrusion 21 is connected and fixed to the roller shade device 3, the decelerating and positioning device 5 and the roll-up control device 4, and an embedding groove 22 is provided above the limiting protrusion 21, wherein the embedding groove 22 embeds a starting end 71 and winds the curtain sheet 7 on the outer surface of the upper rail 20, so that the curtain sheet 7 is driven by the upper rail 20 to being rolled up. The surface of the lower rail 23 is provided with a channel 231 into which a terminal end 72 of the curtain sheet 7 is fitted.

One side of the roller unit 3 is provided with a fixing post 31 in a square prism shape, and the fixing post 31 is coupled to the fixing bracket 6 at a left end, and the other side of the roller shade device 3 is provided with a roller spring 30, and the roller spring 30 is twisted as the curtain sheet 7 is pulled downward by the rotation of the upper rail 20. The roller shade device 3 is a conventional member and will not be described in detail here.

One side of the roll-up control device 4 is provided with a first protruding shaft 41 which is a square prism. The first protruding shaft 41 couples and extends out of the fixing bracket 6 at a right end. The other side of the roll-up control device 4 is provided with a second protruding shaft 42 in a shape of a hexagon. The roll-up control device 4 is a conventional member and will not be described in detail herein.

With reference to FIGS. 3, 4, 5, 6, and 11, the decelerating and positioning device 5 comprises a sleeve 51 decelerating and positioning the roller shade 2, an elastic member 52 decelerating and positioning the roller shade 2 and provided on one side of the sleeve 51, a rotator 53 providing an engagement structure on an other side 522 of the elastic member 52, a limiting rotating body 54 engaging with the rotator 53 and driving the rotator 53 to rotate and displace, and a fixing shaft 55. The limiting rotating body 54 and the rotator 53 rotate on the fixing shaft 55. The fixing shaft 55 is fixed from inside of the sleeve 51.

With reference to FIGS. 3, 4, 5, 6, and 11, the sleeve 51 includes a convex cover wall 511 including a first opening 512, and a protruding rod 513 including a second opening 514 and protruding from a side of the convex cover wall 511. The protruding rod 513 includes a first rod body 515 connected to the side of the convex cover wall 511 and having an outer diameter smaller than that of the convex cover wall 511, a second rod body 516 connected to one side of the first rod body 515 and including an external thread 5161, and a third rod body 517 connected to one side of the second rod body 516 and having an outer diameter smaller than that of the second rod body 516. A first chamber 518 communicating with the first opening 512 is formed in the convex cover wall 511 and the first rod body 515. An outer periphery of one side to the other side of the second rod body 516 is tapered in a conical shape and has an outer diameter larger than that of the first rod body 515. A first shaft hole

5162 including a first fixing portion 5163 is formed in the second rod body 516. A second chamber 519 communicating with the second opening 514, the first shaft hole 5162 and the first opening 512 is formed in the third rod body 517. A first protruding block 5171 is protruding at an end of the third rod body 517. In one embodiment, the first fixing portion 5163 is a protrusion.

With the reference to FIGS. 3, 4, 5, 6, 11, 12, 13, and 14, a side 521 of the elastic member 52 is sheathed on the first rod body 515 of the protruding rod 513 and abuts on the convex cover wall 511. An other side 522 of the elastic member 52 is fixed on one side of the rotator 53. The elastic member 52 extends and retracts between the sleeve 51 and the rotator 53. A first penetrating space 523 and a second penetrating space 524 are formed through the side 521 and the other side 522 of the elastic member 52, wherein the second rod body 516 inserts into the first penetrating space 523, and one side of the rotator 53 inserts into the second penetrating space 524. The elastic member 52 is a spring in the present embodiment, and gaps 525 are formed between turns of the spring. Through the gaps 525, the elastic member 52 compressed by the rotator 53 during the rotation also enhances a buffering deceleration force during rolling of the roller shade 2. The gaps 525 provide the elastic member 52 a large torsional elasticity. The elastic member 52 is provided with a buffer deceleration space with at least one turn, and in the present embodiment, the elastic member 52 is provided with the buffer deceleration space with two turns.

Figure 12:
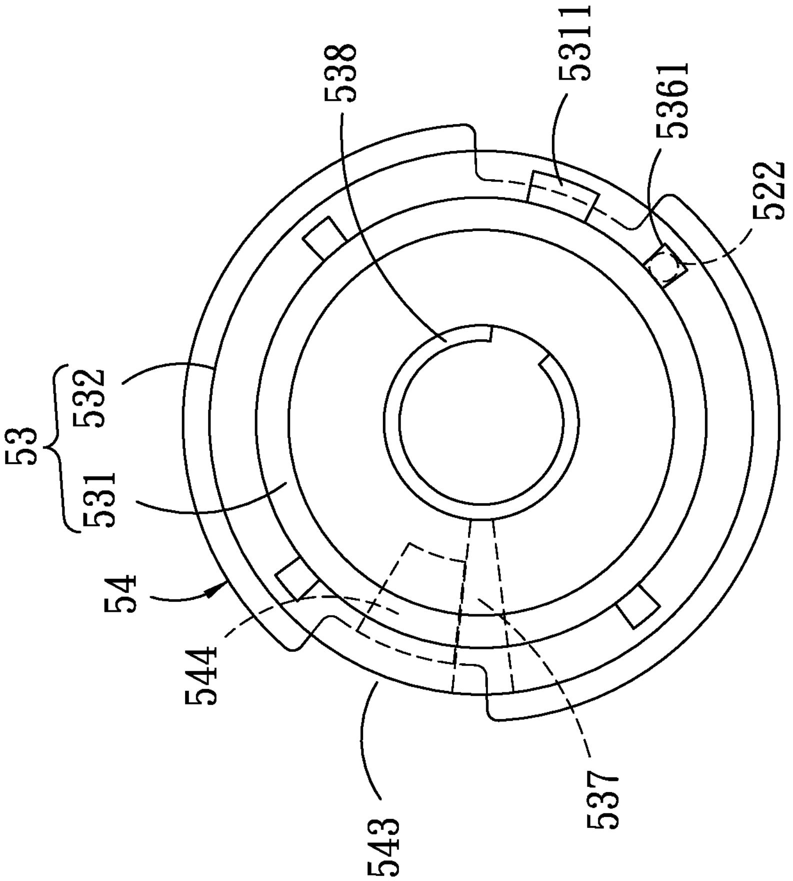
FIG. 12 is a side view of the limiting rotating body of FIG. 10 engaged with the rotator.

With reference to FIGS. 3, 4, 5, 6, 7, 13, and 14, the rotator 53 provides an engagement structure on the other side 522 of the elastic member 52. The rotator 53 includes a protrusion 531 and a clamping part 532 at a side opposite to the protrusion 531. The protrusion 531 includes a third opening 533, and a third chamber 534 communicating with the third opening 533 and being formed in the protrusion 531. A second protruding block 5341 is provided at an end of the third chamber 534, and the second protruding block 5341 abuts the first protruding block 5171. When the rotator 53 screwed to the fixing shaft 55 is rotated by the limiting rotating body 54, the protrusion 531 inserts into the second penetrating space 524, allowing the third chamber 534 of the protrusion 531 to overlap the third rod body 517 until the second protruding block 5341 abuts and engages with the first protruding block 5171 of the third rod body 517. At this time, the highest point of the lower rail 23 of the roller shade is at the highest point when being rolled-up, so-called stopping point D position of the upper limit position. Thus, a buffering deceleration effect is generated when the lower rail 23 of the roller shade 2 reaches an upper limit position C while being rolled-up. In addition, a protruding block 5311 having a space 5312 between the clamping part 532 and restricting the elastic member 52 is provided at an outer circumference of the protrusion 531. The clamping part 532 includes a second shaft hole 535, an inner space 536 partitioned by a ring protrusion 5321, a first abutment 537, and at least one insertion hole 5361. The second shaft hole 535 communicates with the third chamber 534 and the third opening 533. The first abutment 537 connects the ring protrusion 5321 and the clamping part 532. The at least one insertion hole 5361 is formed in the inner space 536 of the clamping part 532. The second shaft hole 535 includes a first threaded portion 538. In this embodiment, four insertion holes 5361 are provided. The at least one insertion hole 5361 allows the other side 522 of the elastic member 52 to be inserted and positioned (as shown in FIG. 12), so that a turn of the other side 522 of the elastic member 52 is inserted into the space 5312, and is limited by the protruding block 5311 from falling off.

With reference to FIGS. 3, 4, 5, 6, 10, 11, and 12, the limiting rotating body 54 is movably screwed to the fixing shaft 55. The limiting rotating body 54 is engaged in the upper rail 20 and is driven by the upper rail 20 to rotate along the fixing shaft 55. The limiting rotating body 54 is provided with a third shaft hole 541 having a second threaded portion 542, and at least one limiting groove 543. The at least one limiting groove 543 corresponds to the limiting protrusion 21 of the upper rail 20, so that the upper rail 20 drives the limiting rotating body 54 to rotate along the fixing shaft 55 through the limiting protrusion 21 of the upper rail 20. Two sides of the limiting rotating body 54 respectively have a second abutment 544 and a third abutment 545 which are adjacent to the limiting groove 543 and are opposite to each other, wherein the second abutment 544 of the limiting rotating body 54 correspondingly engages the first abutment 537 of the rotator 53 and drives the rotator 53 to rotate and displace.

With reference to FIGS. 3, 4, 5, 6, 7, 8, and 9, the fixing shaft 55 allows the limiting rotating body 54 and the rotator 53 to rotate. The fixing shaft 55 is fixed in the sleeve 51. The fixing shaft 55 comprises a shaft rod 551, a convex ring body 552 connected to one side of the shaft rod 551, a third threaded portion 553 connected to the convex ring body 552 and protruding in an opposite direction with respect to the shaft rod 551, and a second fixing portion 554 connected to the third threaded portion 553 and protruding in an opposite direction with respect to the convex ring body 552. The shaft rod 551 includes a fourth shaft hole 5511 and a fixing hole 5513 penetrating the fourth shaft hole 5511, the fourth shaft hole 5511 is a hexagonal hole for inserting the second protruding shaft 42 of the roll-up control device 4, and the shaft rod 551 is fixed by a fixing member 5512 penetrating the fixing hole 5513 and the second protruding shaft 42 at the outer circumference of the shaft rod 551. The convex ring body 552 is provided with a fourth abutment 555 from one side surface facing the third threaded portion 553, and the fourth abutment 555 correspondingly engages the third abutment 545 of the limiting rotating body 54. The third threaded portion 553 fastens with the second threaded portion 542 of the limiting rotating body 54 and the first threaded portion 538 of the rotator 53. The limiting rotating body 54 and the rotator 53 rotates on the third threaded portion 553. An outer surface of the second fixing portion 554 is provided with a groove 5541, and the groove 5541 is correspondingly engaged and fixed with the first fixing portion 5163 which is a protrusion. In one embodiment, the first abutment 537, the second abutment 544, the third abutment 545 and the fourth abutment 555 are bumps.

With reference to FIGS. 3 and 4, the fixing brackets 6 are fixed on both sides above the window. Each of the fixing brackets 6 includes a fixing body 61 installed at one of the two sides above the window and a stand body 62 connected below the fixing body 61. Each of the stand bodies 62 is respectively provided with a through-hole 621 through which the fixing post 31 of the roller shade device 3 and the first protruding shaft 41 of the roll-up control device 4 are coupled.

With reference to FIGS. 3, 7, 8, 9, 10, 11, and 12, when a user wants to roll down the curtain sheet 7 of the roller shade 2, the upper rail 20 rotates to drop down the lower rail 23 to a stop point B of a lower limit position. The upper rail 20 drives the roller shade device 3, the roll-up control device 4, and the limiting groove 543 of the limiting rotating body

Figure 7:
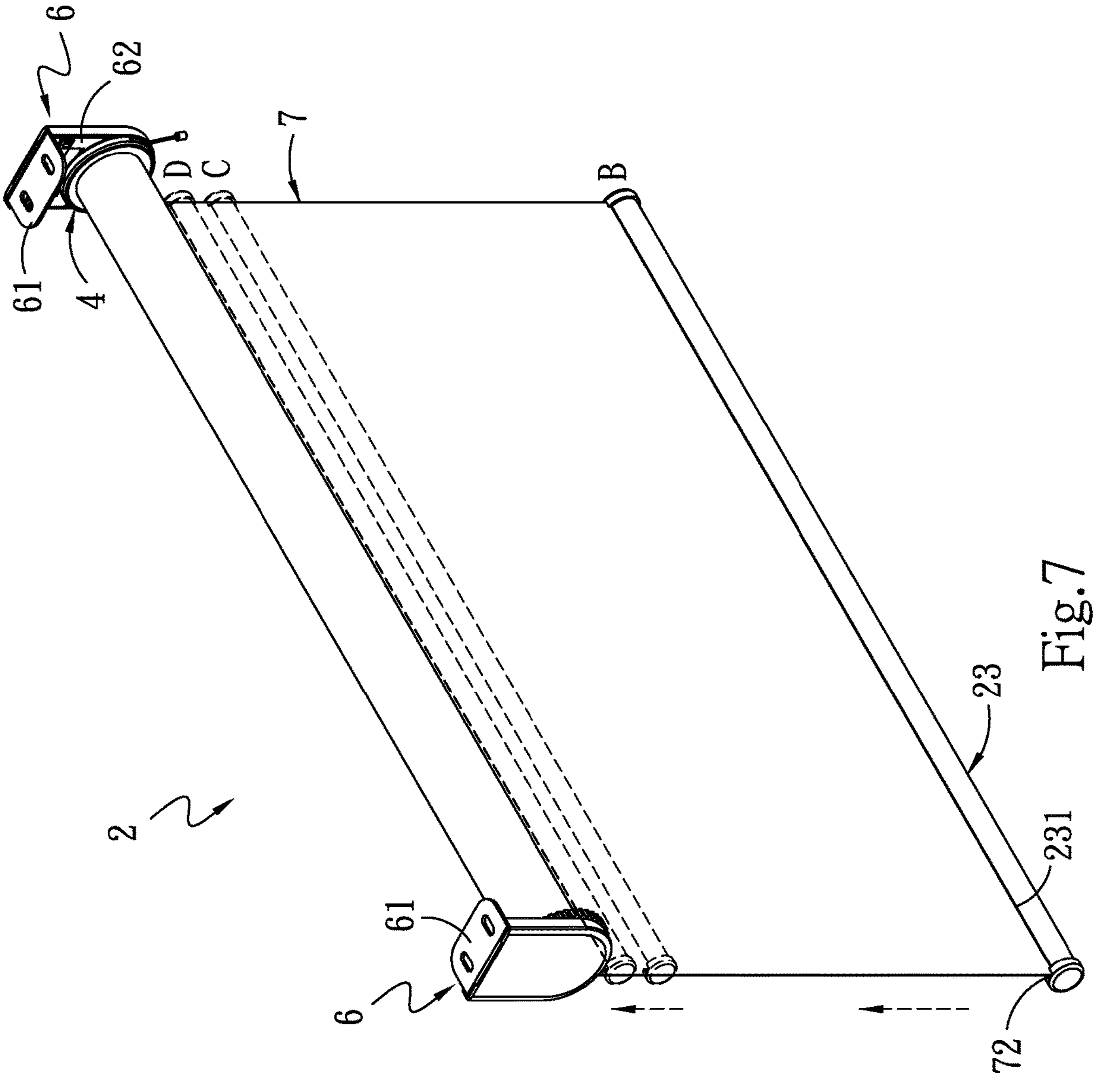
FIG. 7 is a schematic diagram of rolling up the roller shade of FIG. 4.
Figure 8:
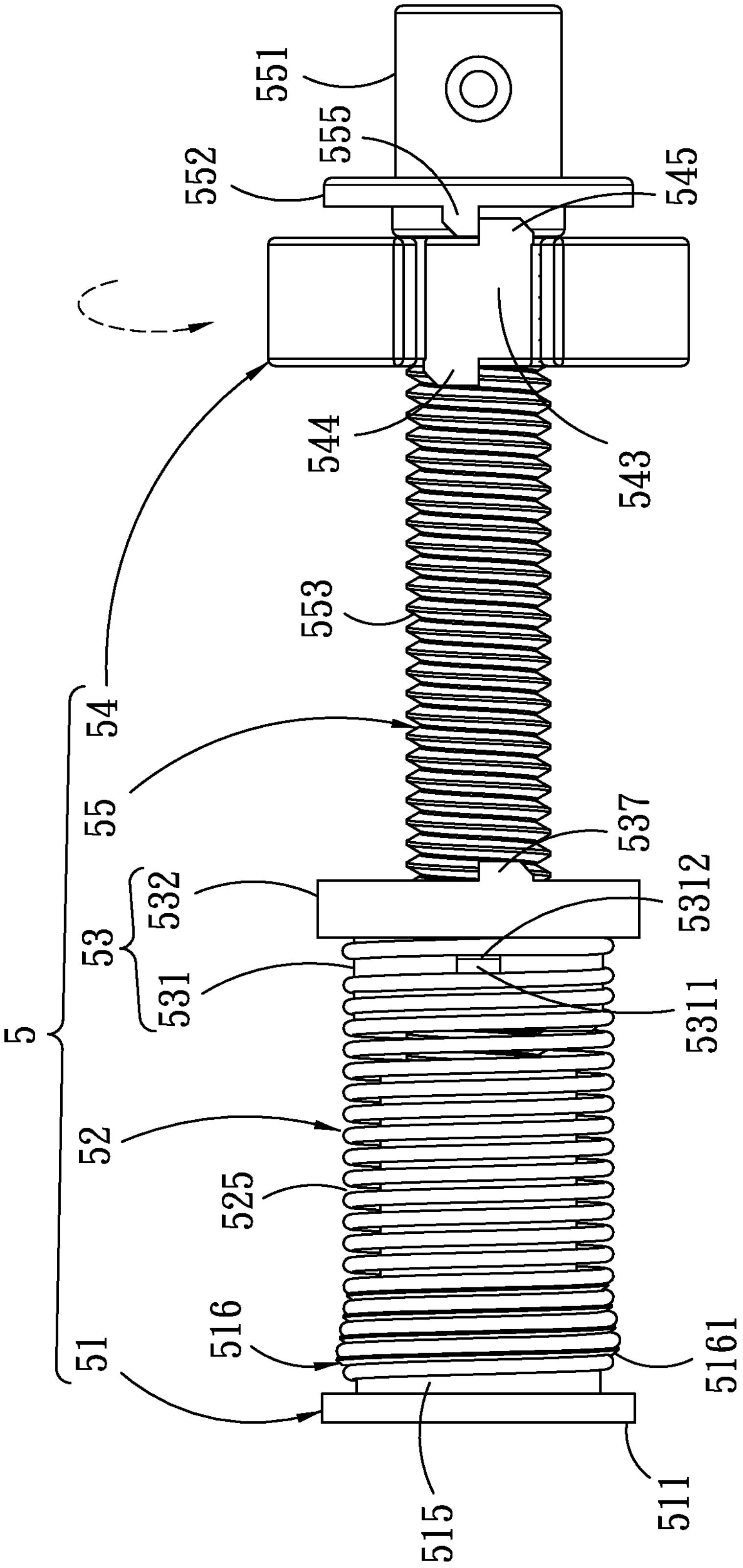
FIG. 8 is a schematic diagram of a lower rail of the roller shade of FIG. 7 being pulled down to a lower limit position with a limiting rotating body to be rotated.
Figure 9:
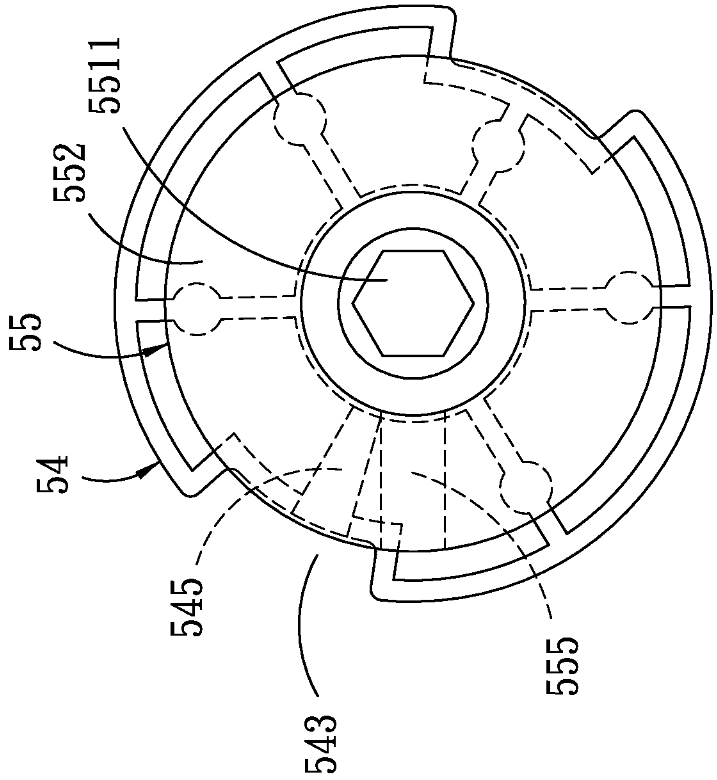
FIG. 9 is a side view of the limiting rotating body of FIG. 8 engaged with the fixing shaft.
Figure 10:
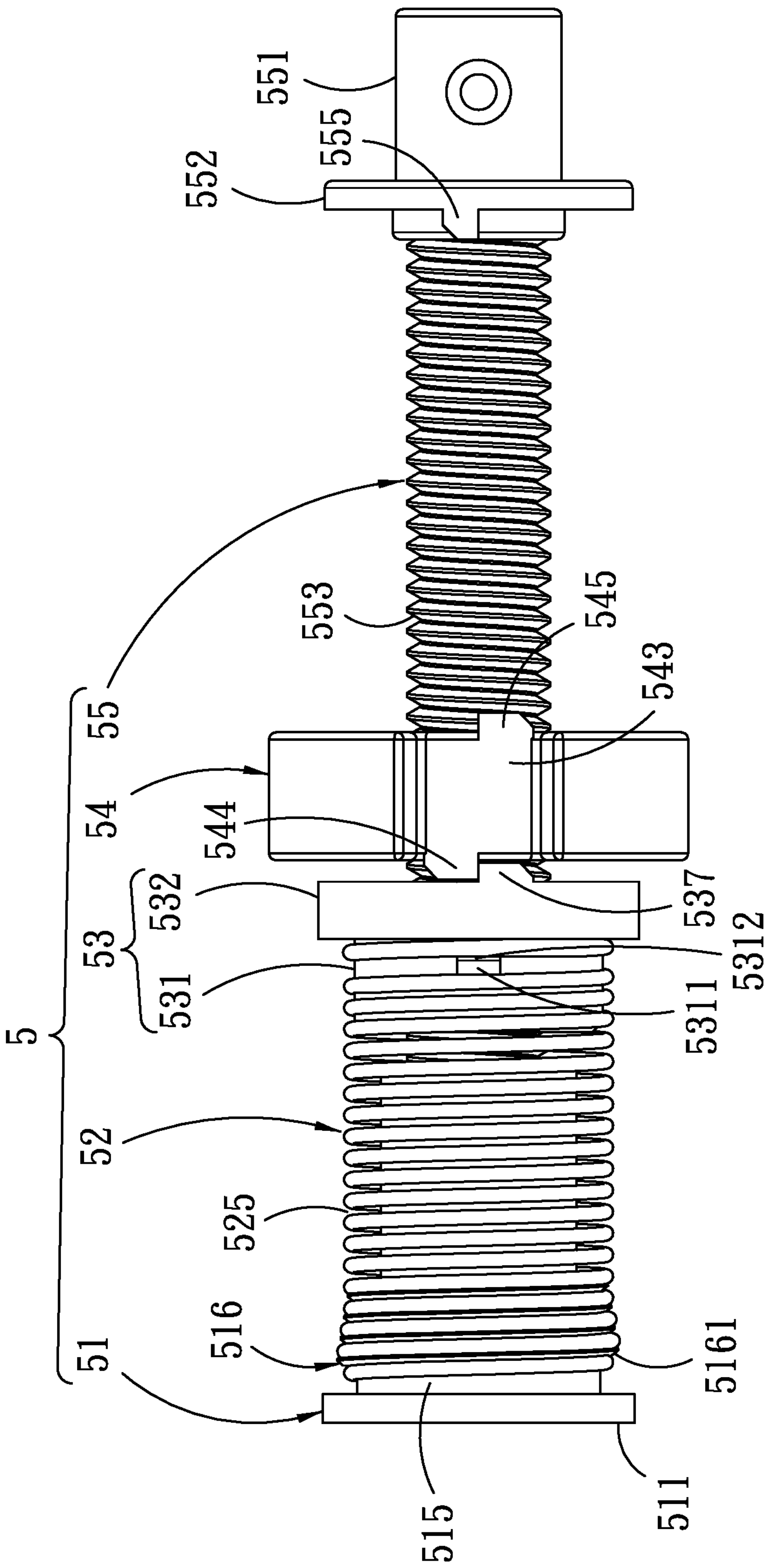
FIG. 10 is a front view of the lower rail of the roller shade of FIG. 7 being rolled up to the upper limit position and the limiting rotating body engaged with the rotator.
Figure 11:
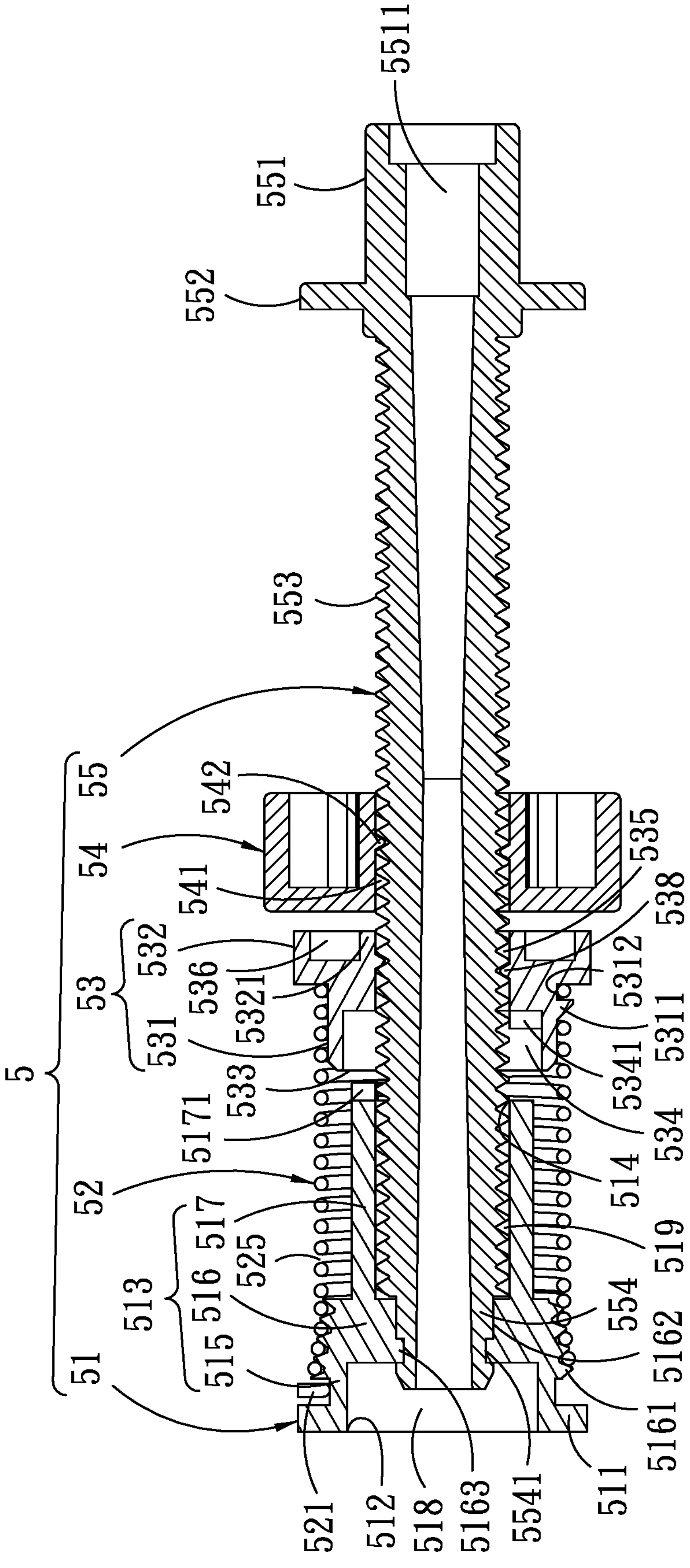
FIG. 11 is a cross-sectional side view of the limiting rotating body of FIG. 10 engaged with the rotator.
Figure 13:
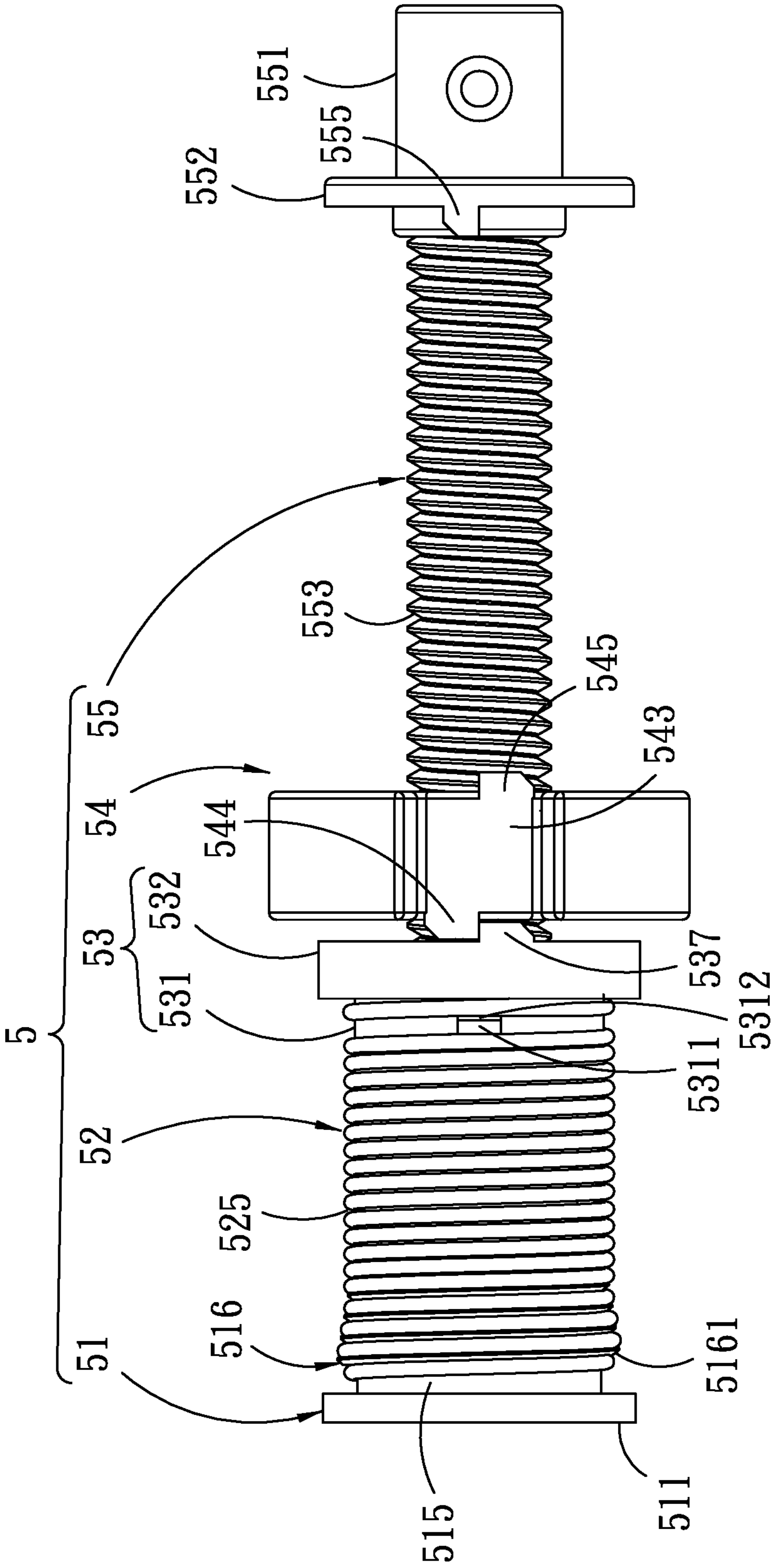
FIG. 13 is a front view of the lower rail of the roller shade of FIG. 7 being rolled up to an upper limit position and a sleeve engaged with the rotator.
Figure 14:
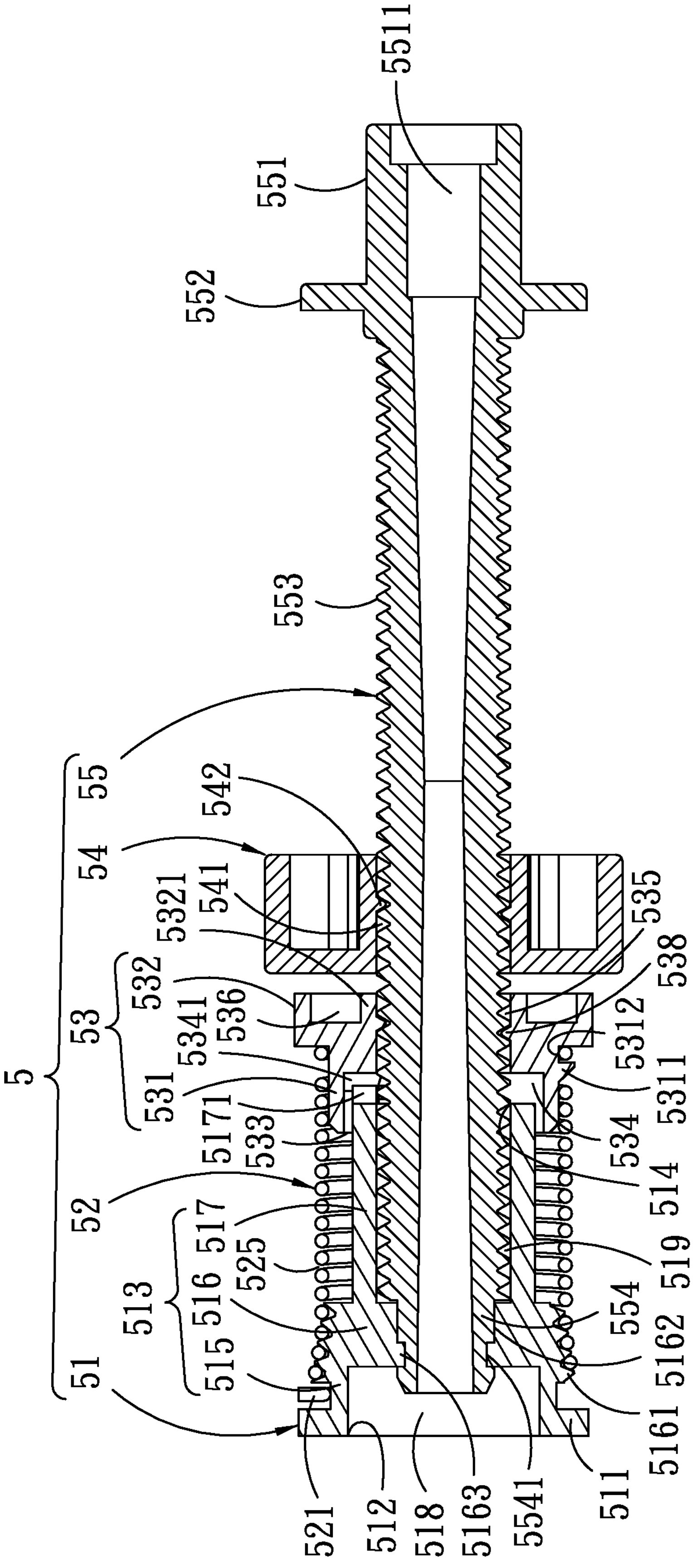
FIG. 14 is a cross-sectional side view of the sleeve of FIG. 13 engaged with the rotator.

54 to rotate with the limiting protrusion 21. The third abutment 545 of the limiting rotating body 54 engages and stops with the fourth abutment 555 of the fixing shaft 55 (as shown in FIGS. 8 and 9). On the contrary, according to the invention, when the lower rail 23 of the roller shade 2 reaches the upper limit position C (as shown in FIG. 7), the second threaded portion 542 of the limiting rotating body 54 engages with the third threaded portion 553 of the fixing shaft 55 to rotate from the position adjacent to the rotator 53. When the limiting rotating body 54 pushes against the rotator 53, the second abutment 544 of the limiting rotating body 54 engages with the first abutment 537 of the rotator 53 and is stopped. The limiting rotating body 54 drives the rotator 53 to rotate (as shown in FIGS. 10, 11, and 12). The rotator 53 then twists the elastic member 52 coupled to the rotator 53, and the protrusion 531 of the rotator 53 rotates and displaces from the second penetrating space 524 and compresses the elastic member 52. When the elastic member 52 is compressed by the rotator 53 when rotating and moving, the elastic member 52 also enhances a buffering deceleration force when rolling up the roller shade 2, and makes the elastic member 52 have a larger torsional elastic force. During a first turn of the buffering deceleration space of the elastic member 52, the second protruding block 5341 of the rotator 53 has not engage with the first protruding block 5171 of the sleeve 51. During a second turn of the buffering deceleration space of the elastic member 52, the protrusion 531 of the rotator 53 rotates towards the third rod body 517, and the third rod body 517 is inserted into the third chamber 534 of the protrusion 531 until the second protruding block 5341 of the rotator 53 engages with the first protruding block 5171 of the sleeve 51 to stop (as shown in FIGS. 13 and 14). Then, the lower rail 23 is positioned at the stop point D, so-called the highest upper limit position of the roller shade 2 being rolled on. Thus, a buffering deceleration effect is generated when the lower rail 23 is rolled up on the roller shade 2 and reaches the upper limit position C (as shown in FIG. 7), so as to reduce impact force and noise and avoid damage to parts inside the decelerating and positioning device 5.

What is claimed is:

1. A decelerating and positioning device for a roller shade, comprising:

a sleeve, comprising a convex cover wall and a protruding rod protruding from a side of the convex cover wall, wherein the convex cover wall comprises a first opening, the protruding rod comprises a second opening, a first chamber communicating with the first opening is formed in the convex cover wall and one side of the protruding rod, a first shaft hole including a first fixing portion is formed in the protruding rod, a second chamber communicates with the second opening, the first shaft hole and the first opening is formed in the protruding rod, and a first protruding block protrudes at an end of the protruding rod;

an elastic member, wherein a first side of the elastic member is sheathed on one side of the sleeve, a second side of the elastic member is fixed on a side of a rotator, and the elastic member extends and retracts between the sleeve and the rotator;

the rotator providing an engagement structure on the second side of the elastic member, wherein the rotator comprises a protrusion and a clamping part at a side opposite to the protrusion, wherein the protrusion comprises a third opening, a third chamber communicating with the third opening and being formed in the protrusion, and a second protruding block being provided at an end of the third chamber, the second protruding block abuts the first protruding block, wherein the clamping part comprises a second shaft hole, an inner space partitioned by a ring protrusion, a first abutment, and at least one insertion hole, the second shaft hole communicates with the third chamber and the third opening, the first abutment connects the ring protrusion and the clamping part, the at least one insertion hole is formed in the inner space of the clamping part and allows the other side of the elastic member to be inserted and positioned, and the second shaft hole includes a first threaded portion;

a limiting rotating body, being movably screwed to a fixing shaft, the limiting rotating body being provided with a third shaft hole having a second threaded portion, and at least one limiting groove, wherein two sides of the limiting rotating body respectively have a second abutment and a third abutment which are adjacent to the at least one limiting groove and are opposite to each other, and the second abutment of the limiting rotating body correspondingly engages the first abutment of the rotator;

the fixing shaft, allowing the limiting rotating body and the rotator to rotate, the fixing shaft is fixed in the sleeve, wherein the fixing shaft comprises a shaft rod, a convex ring body connected to one side of the shaft rod, a third threaded portion connected to the convex ring body and protruding in an opposite direction with respect to the shaft rod, and a second fixing portion connected to the third threaded portion and protruding in an opposite direction with respect to the convex ring body, the convex ring body is provided with a fourth abutment from one side surface facing the third threaded portion, the fourth abutment correspondingly engages the third abutment of the limiting rotating body, the third threaded portion fastens with the second threaded portion of the limiting rotating body and the first threaded portion of the rotator, and the second fixing portion engages the first fixing portion;

wherein when winding the roller shade up to an upper limit position, the limiting rotating body rotates and pushes the rotator to rotate and displace, the rotator further compresses the elastic member fixed with the rotator, and a buffering deceleration effect is generated.

2. The decelerating and positioning device for a roller shade according to claim 1, wherein the protruding rod comprises a first rod body connected to the side of the convex cover wall and having an outer diameter smaller than an outer diameter of the convex cover wall, a second rod body connected to one side of the first rod body, and a third rod body connected to one side of the second rod body and having an outer diameter smaller than an outer diameter of the second rod body, the second rod body comprises an external thread screwed into the elastic member, an outer periphery of the second rod body is tapered in a conical shape, and the outer diameter of the second rod body is larger than the outer diameter of the first rod body.

3. The decelerating and positioning device for a roller shade according to claim 2, wherein a first penetrating space and a second penetrating space are formed through the first and second sides of the elastic member, the second rod body inserts into the first penetrating space, and the side of the rotator inserts into the second penetrating space.

4. The decelerating and positioning device for a roller shade according to claim 3, wherein an outer circumference of the protrusion of the rotator is provided with a protruding block between the clamping part and restricting the elastic member.

5. The decelerating and positioning device for a roller shade according to claim 4, wherein the elastic member is a spring.

6. The decelerating and positioning device for a roller shade according to claim 1, wherein the first abutment, the second abutment, the third abutment and the fourth abutment are bumps.

7. The decelerating and positioning device for a roller shade according to claim 1, wherein the first fixing portion is a protrusion, and an outer surface of the second fixing portion comprises a groove correspondingly engaged with the first fixing portion.

8. The decelerating and positioning device for a roller shade according to claim 1, wherein the shaft rod comprises a fourth shaft hole and a fixing hole penetrating the fourth shaft hole, and the fourth shaft hole is a hexagonal hole and is fixed with a fixing member penetrating the fixing hole at an outer circumference of the shaft rod.

* * * * *